US005685926A

United States Patent [19]
Kejha

[11] Patent Number: 5,685,926
[45] Date of Patent: Nov. 11, 1997

[54] LIGHTWEIGHT, SAFE AND DAMAGE RESISTANT TIRE HAVING HONEYCOMB CORE

[75] Inventor: Joseph B. Kejha, Meadowbrook, Pa.

[73] Assignee: Electrion, Inc., Meadowbrook, Pa.

[21] Appl. No.: 583,467

[22] Filed: Jan. 5, 1996

Related U.S. Application Data

[63] Continuation-in-part of Ser. No. 178,427, Jan. 7, 1994, Pat. No. 5,494,090.

[51] Int. Cl.$^6$ .................................................. B60C 7/00
[52] U.S. Cl. .................... 152/157; 152/159; 152/165; 152/310; 152/315; 152/319; 152/328; 152/384
[58] Field of Search ........................ 152/310, 311, 152/312, 315, 318–329, 384, 155, 157, 159, 161, 165, 166

[56] References Cited

U.S. PATENT DOCUMENTS

| | | | |
|---|---|---|---|
| 1,215,577 | 2/1917 | Reeder | 152/320 |
| 1,396,515 | 11/1921 | McClevey | 152/384 |
| 1,841,773 | 1/1932 | Worsley et al. | 152/328 |
| 2,550,773 | 5/1951 | Christensen et al. | |
| 2,709,471 | 5/1955 | Smith et al. | |
| 2,713,373 | 7/1955 | Daugherty | 152/384 |
| 2,896,687 | 7/1959 | Smith et al. | |
| 3,022,810 | 2/1962 | Lambe. | |
| 4,169,494 | 10/1979 | Kubica et al. | 152/310 |
| 4,894,281 | 1/1990 | Yagi et al. | 428/286 |
| 5,494,090 | 2/1996 | Kejha | 152/310 |

FOREIGN PATENT DOCUMENTS

| | | | |
|---|---|---|---|
| 59258 | 11/1941 | Denmark | 152/328 |
| 2748886 | 5/1979 | Germany | 152/320 |

Primary Examiner—Geoffrey L. Knable

[57] ABSTRACT

A lightweight, filler core tire construction for automotive and other vehicles, having a flexible composite outer layer structure and an inner flexible honeycomb core with a radial relief and said honeycomb is bonded to said outer layer, eliminating thus fully or partially pressurized air from the tire and increasing the safety of driving, damage resistance, and minimizing servicing of the tire. The structures are preferably made of a polyurethane polymer and various fibers and do not require a split rim for mounting and dismounting said tire.

48 Claims, 4 Drawing Sheets

LIGHTWEIGHT, SAFE AND DAMAGE RESISTANT TIRE HAVING HONEYCOMB CORE

CROSS REFERENCE TO RELATED DOCUMENTS

This application is related to a prior co-pending Disclosure Document of Joseph B. Kejha, Ser. No. 382,229 filed Sep. 26, 1995, entitled "Lightweight, Safe and Damage Resistant Tire". This application is also a continuation in part of the prior patent application of Joseph B. Kejha, Ser. No. 08/178,427, filed Jan. 7, 1994, now U.S. Pat. No. 5,494,090, entitled "Lightweight Pressure-Airless Tire Construction.

BACKGROUND OF THE INVENTION

1. Field of the Invention

This invention pertains to non-pressurized, filler core tire construction for automobiles and various utility vehicles, which replaces the pressurized air in the tire by a lightweight flexible filler material of a honeycomb construction, thus increasing driving safety, damage resistance, and eliminating servicing of the tire.

2. Description of Related Art

Prior art tires for automobiles and other vehicles are usually filled with pressurized air to absorb the shocks of the road, or are filled with a sponge-like elastic foam, or a solid elastic rubber or a polymer, as is described in U.S. Pat. Nos. 3,022,810; 2,709,471 and 2,550,773 or may include various filler structures as described in U.S. Pat. Nos. 1,841,773; 4,169,494; 4,894,281; 2,713,373 and 1,396,515; and in Danish patent No. 59,258 and in German patent No. 2,748,886.

U.S. Pat. No. 3,022,810 discloses a tire inflated by means comprising a closed cell, gas pressurized rubber foam.

U.S. Pat. No. 2,709,471 discloses a solid tire, which is easily mounted and dismounted and fits tightly on a wheel without slippage.

U.S. Pat. No. 2,550,773 discloses a tire having a shock resistant, puncture-sealing, pneumatic construction which includes a plurality of shock resistant pillars.

U.S. Pat. No. 1,841,773 discloses a vulcanized tire constructed from a plurality of molded cylindrical air cells in annular layers, but having unnecessary excess material between the cells resulting in heavier tire and is difficult to make uniformed and balanced.

U.S. Pat. No. 4,169,494 discloses a tire having honeycomb cells parallel with the axis of the tire resulting in lesser stiffness against compression and thus a heavier tire.

U.S. Pat. No. 4,894,281 discloses a fiber reinforced polymer body, which contains a molecularly oriented and silane crosslinked ultra-high molecular weight polyethylene fibers and has a process temperatures less than 220° C. This patent does not mention use of polyurethane matrix.

U.S. Pat. No. 2,713,373 discloses a semi-pneumatic tire having internal load carrying ribs formed on its base.

U.S. Pat. No. 1,396,515 discloses a pneumatic tire heaving corrugations on its inner diameter matching corrugations on the rim to prevent slippage during acceleration or braking.

Danish Patent No. 59,258 discloses a tire having hexagonal all sides conical cells oriented from the center of the tire. The cells are difficult to make by molding and also it may be difficult to balance the tire. The Danish patent does not disclose how to manufacture the cells.

German Patent No. 2,748,886 discloses a tire filled with a honeycomb core of hexagonal cells oriented circumferentially like circular hoses. This orientation causes less stiffness and results in a heavier tire. This core is very difficult to manufacture and offers less damage resistance.

While pressurized-air filled tires are adequate for most applications and are relatively lightweight, they are also very dangerous during a blow-out or a flat, causing accidents and require servicing.

The foam filled or solid rubber tires are suitable for slow moving utility vehicles, and they are also heavy and do not absorb shocks properly. These tires do not last long enough to be competitive, and they are sometimes used as spare tires.

Although fillers for tires comprising various cell constructions have been proposed, none of the disclosed structures is satisfactory for practical manufacture, stiffness and light weight and many of the tires also require a split rim wheel for mounting and dismounting.

The lightweight and safer, damage resistant tire construction of the invention does not suffer from the prior art problems and provide many positive advantages.

SUMMARY OF THE INVENTION

It has now been found that a lightweight, safer and damage resistant, non-pressurized core tire construction can be made by replacing the pressurized air in the tire completely or partially with a filler material, which is a flexible, elastic, preferably hexcell honeycomb or other shape cell honeycomb construction and preferably from a polyurethane polymer reinforced with various fibers. The cells of the honeycomb material should be oriented substantially lengthwise from the center of the wheel to the outside circumferential surface of the tire and should have a conical shape. The described filler material can be engineered into any desired density, pressure resistance and flexibility and thus to any desired energy absorption rate, while still being lightweight and fatigue resistant. In addition, it has been found that if the filler structure is made with a radial relief space in the bottom center of the section of the core facing the rim, it creates a sectional bridge, which makes it possible to mount the tire by stretching it over the rim, similar to the prior art pressurized air tires, and thus the tire does not need a split rim for mounting or dismounting.

The principal object of the invention is to provide tire construction for automobiles and other vehicles, which is safer than prior art tires, and which is lightweight.

A further object of the invention is to provide tire construction for automobiles and other vehicles which is easy to manufacture, and has a long useful life.

A further object of the invention is to provide tire construction for automobiles and other vehicles which is damage resistant.

A further object of the invention is to provide tire construction for military vehicles.

A further object of the invention is to provide tire construction for automobiles and other vehicles, which does not require servicing.

A further object of the invention is to provide tire construction for electric vehicles.

A further object of the invention is to provide tire construction which does not require a split rim for mounting and dismounting the tire.

A further object of the invention is to provide tire construction which may also serve as a safe tire in case of air pressure loss.

Other objects and advantageous features of the invention will be apparent from the description and claims.

BRIEF DESCRIPTION OF THE DRAWINGS

The nature and characteristic features of the invention will be more readily understood from the following description taken in connection with the following description taken in connection with the accompanying drawing forming part hereof in which.

DESCRIPTION OF THE PREFERRED EMBODIMENTS

When referring to the preferred embodiments, certain terminology will be utilized for the sake of clarity. Use of such terminology is intended to encompass not only the described embodiment, but also all technical equivalents which operate and function in substantially the same way to bring about the same result.

The invention was generally described in my Disclosure Document No. 382,229.

Figure 1:
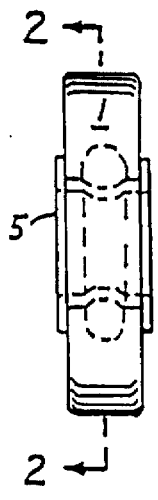
FIG. 1 is a front plan view of a tire of one embodiment of the invention.
Figure 2:
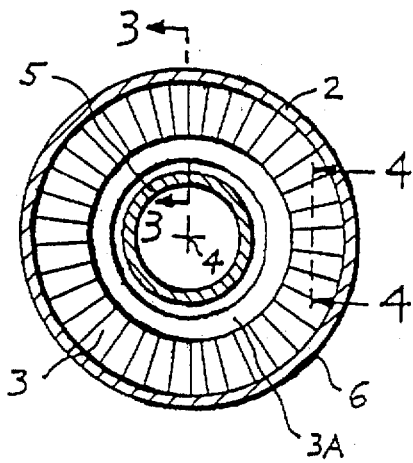
FIG. 2 is a vertical sectional view taken approximately on the line 2—2 of FIG. 1, illustrating the "star" like orientation of the honeycomb core cells in the core structure, and a relief in the structure, according to the subject invention.
Figure 3:
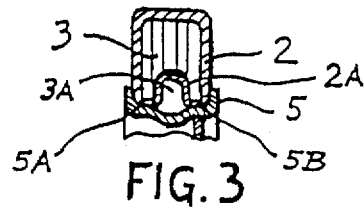
FIG. 3 is a vertical sectional enlarged view, taken approximately on the line 3—3 of FIG. 2, showing the outer layer structure and the core with a relief, according to the subject invention.

Referring now in more detail particularly to the drawings and FIGS. 1, 2, and 3 thereof, one embodiment of nonpressurized tire 1 of the invention is illustrated which comprises an outer flexible layer structure 2, made of a polyurethane polymer matrix reinforced with various fibers, which may be ultrahigh molecular weight polyethylene fibers, steel fibers or other fibers (not shown). The outer layer structure 3 has the cells formed into a "star" configuration as shown in FIG. 2, directed lengthwise approximately from the center 4 of the wheel rim 5 to the outside circumferential surface 6 of the tire and may be evenly spaced and of a conical shape. This core structure 3 may be engineered and manufactured in any desired density, pressure resistance, and flexibility and thus any desired absorption rate, while still being lightweight.

The core structure 3 may have a radial relief 3A carved into it, which provides the space necessary for stretching the tire over the rim 5, similar to well known prior art pressurized air tires. The core 3 may have also an optional reinforcing "skin" layer 2A facing the relief 3A, creating a "bridge." The skin layer 2A may also contain several axial leaf springs (not shown), which help to force the tire tightly on the rim 5 and may be reinforced by fibers and bonded to core 3. When the tire is stretched and assembled onto the rim 5, it may not sit properly on the elevated diameter (seats) 5A and 5B of the rim 5. Therefore it may be necessary to use (temporarily or permanently) pressurized air to fill the radial space relief 3A, and force the inner diameter of the tire on both sides onto the elevated diameter 5A and 5B of the rim 5, to secure it against slippage. The pressurized air may then be discharged. The leaf springs (not shown) will lock the tire in the described position. Diameters 5A and 5B should be slightly larger than the inner diameter of the tire to create a "press fit" and thus a friction transfer of the torque between the rim 5 and the tire 1.

Figures 4, 5, 6, 7:
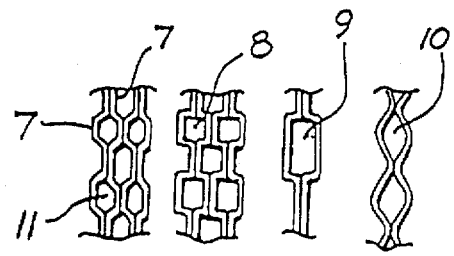
FIG. 4 is a partial sectional view, taken approximately on the line 4—4 of FIG. 2, showing the construction of the hexagonally shaped sells in washer-like layers, according to the subject invention.
FIG. 5 illustrates the square cells embodiment of core construction in washer-like layers, according to the subject invention.
FIG. 6 illustrates the rectangular cells embodiment of core construction in washer-like layers, according to the subject invention.
FIG. 7 illustrates the rounded cells embodiment of core construction in washer-like layers, according to the subject invention.
Figure 8:
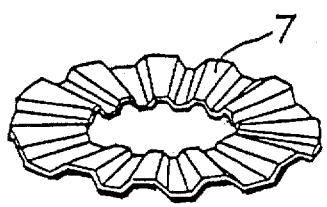
FIG. 8 illustrates a single corrugated washer-like layer of the honeycomb core construction, according to the subject invention.

The hexcell honeycomb is the most lightweight core construction known in the structural applications, and in the construction shown, the tire of the invention may be formed from a plurality of corrugated washer-like sheets 7 (or their segments), as shown in FIG. 8, which are stacked on top of each other and bonded or welded together, as shown in FIG. 4, and which are other embodiments of the invention. Each pair of sheets 7 forms cells there-between, which have two parallel sides, as shown in FIGS. 3 through 7. The resulting conical shape of the cells, with the larger sectional area at the outside circumferential surface 6 of the tire, and with the smaller sectional area at the rim 5 of the wheel makes the core structure 3 denser and stiffer at the rim 5, and thinner and softer at the outside circumferential surface 6 of the tire, which is very desirable.

In another embodiment of the invention, the corrugation of the sheets 7 and resulting sectional profile of the cells may be of a square shape 8 as shown in FIG. 5, a rectangular shape 9, as shown in FIG. 6, or a rounded shape 10, as shown in FIG. 7, or any desired shape, but the hexagonal and/or the rectangular shape 9 are preferred. The core structure 3 is also bonded in well known manner to the outer layer structure 2.

Figure 9:
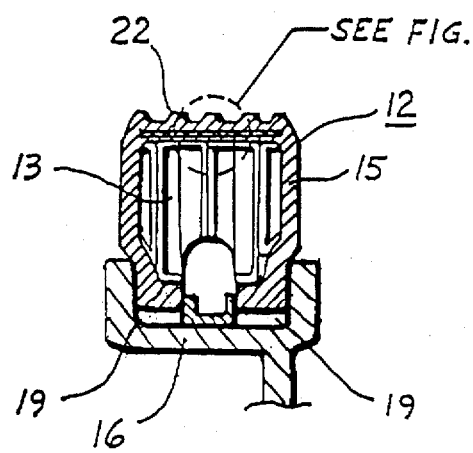
FIG. 9 illustrates a partial sectional view of a tire with rim attachments, according to the subject invention.
Figure 10:
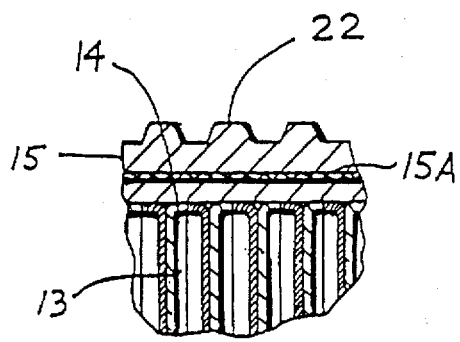
FIG. 10 is an enlarged partial and sectional view of the flange joints between the outer layer structure of the tire and the cells of the core and with a radial belt embedded in the outer layer, according to the subject invention.

Now referring additionally to FIGS. 9 and 10, other embodiments of the invention are disclosed which show a partial sectional view of a tire 12, where the ends of the cells of the core structure 13 may have flanges 14, as shown in FIG. 10, and the flanges may be continuously part of the cell material. This addition improves the bonding or welding of the cell material of the core structure 13 to the outer layer structure 15 of the tire, and better distributes the joint stress loads from the outer layer structure 15 of the tire into the cells, during riding or standing of the tire.

The tire 12 may have also substantially axial serrations or spline teeth 19 on its surface to be matched by substantially axial serrations or teeth (not shown) on the surface of the rim 16, for a torque load transfer between the rim and the tire. The serrations or spline teeth may also be only on the rim 16, and then "bite" into the smooth and softer surface of the tire 12. The tire 12 may be stretched (pre-loaded) onto the rim 16 to improve friction fitting and thus connection to the rim. The tire 12 may also be bonded to the rim 16.

The outer layer structure 15 of the tire 12 should be adhesively bonded or welded to the honeycomb filler core structure 13, to resist radial and axial (cornering) loads on the tire, but to flex as desired and engineered for, to absorb shocks and other loads from the road.

The outer layer structure 15 and the core structure 13 may also be made from other elastic materials, including rubber, but a polyurethane elastic polymer is preferred. All the materials used may also contain a carbon filler or other fillers (not shown).

In addition, the same, or substantially similar materials should be used for the core structure 13 and the outer layer structure 15 construction, to improve the bonding there between.

The bonding may be accomplished by using an adhesive, fusion bonding, or by other known welding methods, including an ultrasound welding. The filler core material may also be reinforced with various fibers and or fillers (not shown). The outside circumferential surface of the tire 12 may also have a tread 22, and the outer layer 15 may have a radial belt 15A embedded in it.

Figure 11:
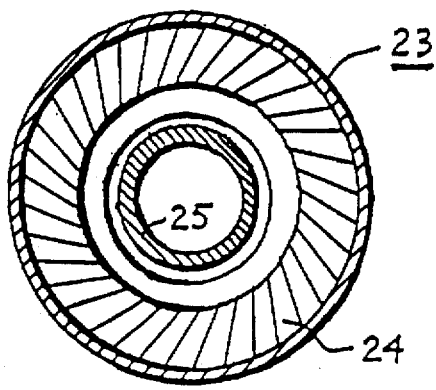
FIG. 11 illustrates a tangential configuration of the honeycomb core cells in a tire, in relation to the rim of a wheel, according to the subject invention.

Now referring additionally to FIG. 11, which is another embodiment of the invention, a sectional view of a tire 23 is illustrated, and the tire may have the cells in the flexible honeycomb core structure 24, positioned in tangential configuration in relation to the rim 25 of the wheel. This described configuration results in a more flexible tire.

Figure 12:
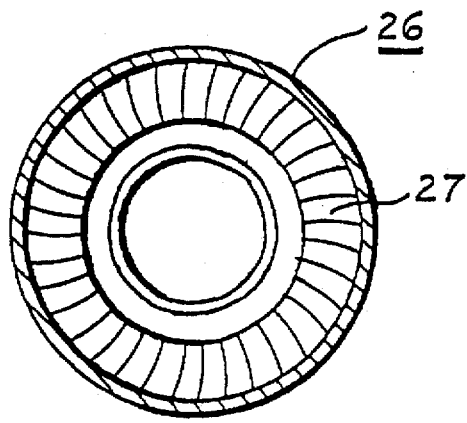
FIG. 12 illustrates a curved configuration of the honeycomb core cells construction, according to the subject invention.

In FIG. 12, which is another embodiment of the invention, a sectional view of a tire 26 is illustrated, and the tire may have curved shape cells in the flexible honeycomb core structure 27, but in substantially a "star" configuration as described and as shown. The shape of the curves may be of geometrical construction, such as a parabolic shape, and other desired curve shape, or may be any free shape created, including "S" shape and multiple "S" shapes, which will result in bellow-like cells (not shown).

Figure 13:
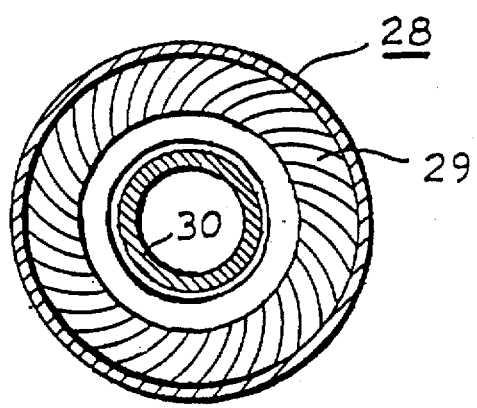
FIG. 13 illustrates a tangential, curved and configuration of the honeycomb core cells construction, according to the subject invention.

In another embodiment of the invention, which is shown in FIG. 13, as a sectional view of a tire 28, there may be a combination of the tangential and curved configurations of the cells in the flexible honeycomb core structure 29, resulting in a tangential, curved configuration of the cells in relation to the rim of the wheel 30.

Figure 14:
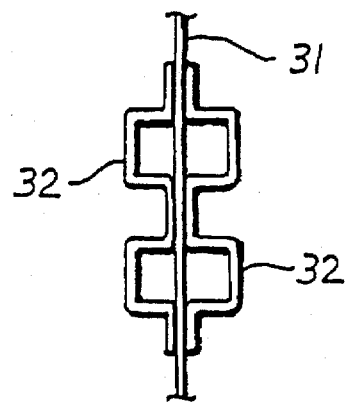
FIG. 14 illustrates a "half cell" construction of the honeycomb core with a flat washer inserted between the corrugated washers, according to the subject invention.

FIG. 14, which is another embodiment of the invention, illustrates a "half cell" construction of the honeycomb core, and the flat washers 31 may be inserted between the corrugated washers 32 and bonded together.

Figure 15:
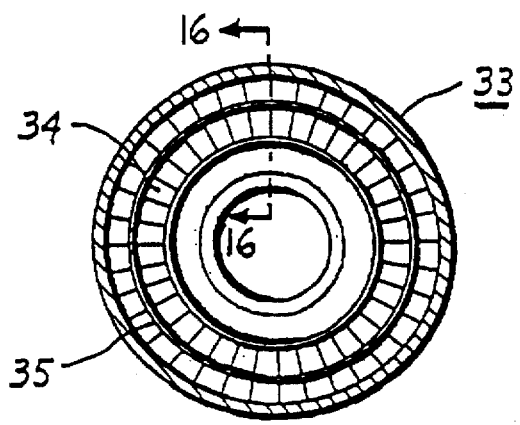
FIG. 15 illustrates multiple radial layers of cells in the honeycomb core, according to the subject invention.
Figure 16:
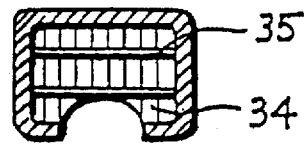
FIG. 16 is a vertical sectional view taken approximately on the line 16—16 of FIG. 15, showing several radial layers of the cells in the core of a tire, according to the subject invention.
Figure 17:
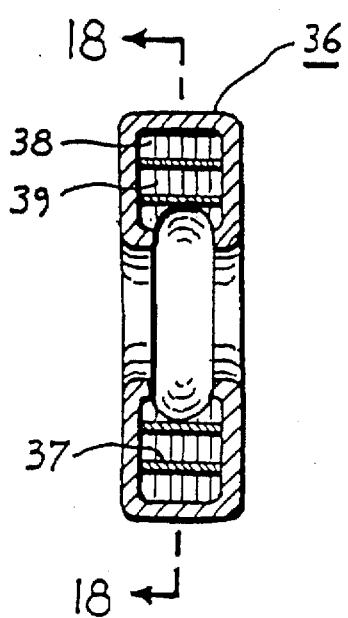
FIG. 17 illustrates multiple radial layers of the cells in the honeycomb core of a tire, with various configurations of the cells and various combined sectional cell shapes, according to the subject invention;.
Figure 18:
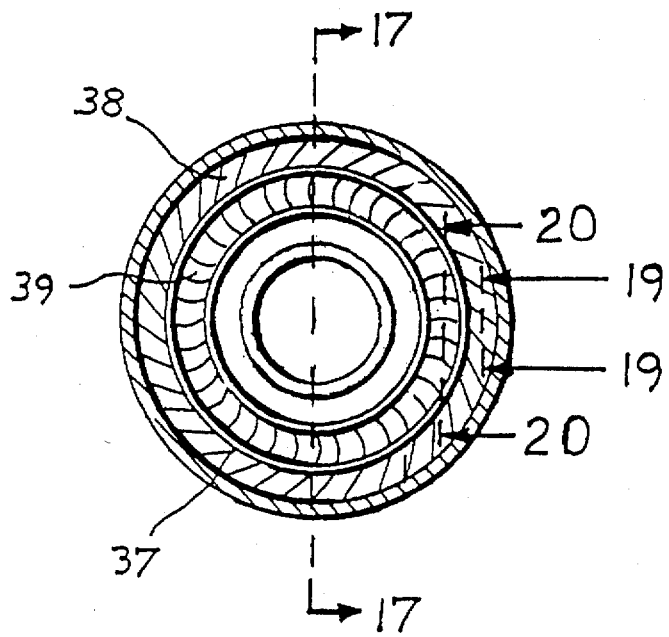
FIG. 18 is a vertical sectional view, taken approximately on the line 18—18 of FIG. 17, showing several radial layers of the cells in the core, having various configurations, according to the subject invention.
Figure 19:
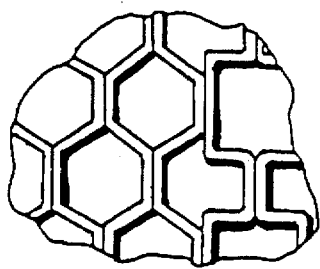
FIG. 19 is a partial sectional enlarged view, taken approximately on the line 19—19 of FIG. 18, showing various sectional shapes of the cells combined in this layer.
Figure 20:
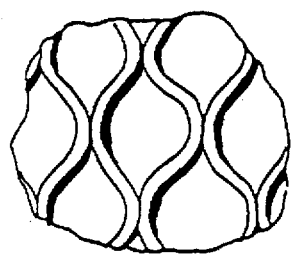
FIG. 20 is a partial sectional enlarged view, taken approximately on the line 20—20 of FIG. 18, showing rounded sectional shape of cells in this layer.

FIG. 15 and 16, which are other embodiments of the invention, illustrate sectional views of a tire 33 which may have the core constructed from more than one radial layer 34 of cells, separated by radial belts 35, with the layers and belts bonded together in well known manner.

Another embodiment of the invention, is shown in FIGS. 17, 18, 19, and 20, as sectional views of a tire 36, with various sectional cell shapes and configurations of cells, which may be combined to form a honeycomb core 37, and its radial layers of cells 38 and 39, which may be in any sequence and in any quantity desired to customize the flexibility and energy absorption of the tire. The square and rectangular cells are stiffer to side (axial) loads on the tire.

Figure 21:
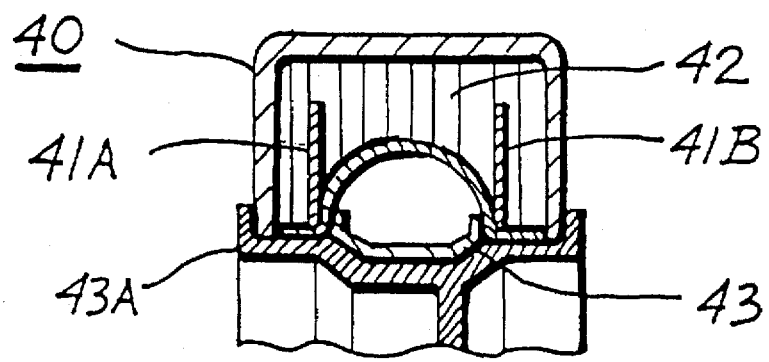
FIG. 21 is a sectional view similar to FIG. 3, showing a relief in the core which includes reinforcing discs and rim insert, according to the subject invention.

In another embodiment of the invention shown in FIG. 21 as a sectional view of a tire 40, (which is similar to the sectional view shown in FIG. 3) said tire may have optional reinforcing, flexible radial discs 41A and 41B inserted and bonded into the honeycomb core 42. The tire 40 may be additionally secured in the position by optional radial rim insert 43, which is added to the rim 43A, to further prevent inward collapsing of the tire. Said radial rim insert 43 may be constructed from two clamping halves which are bolted together, and can be added to any wheel rim.

Figure 22:
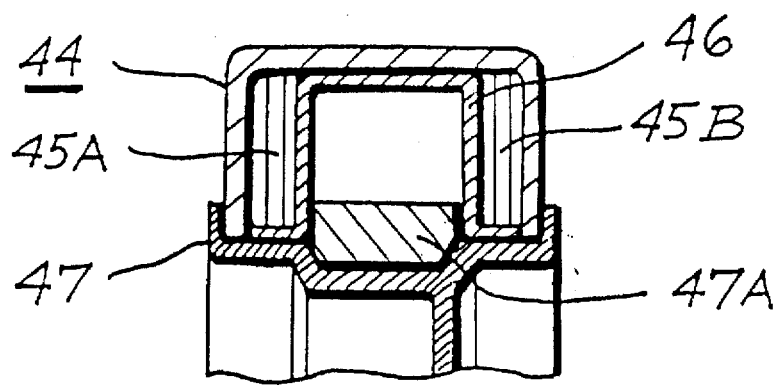
FIG. 22 is a sectional view, similar to FIG. 3, showing an enlarged relief of the core with honeycomb reinforcing discs in the side walls of the tire, according to the subject invention.

Referring additionally to FIG. 22, which is another embodiment of the invention, showing similarly a sectional view of a tire 44, having the side walls of the tire reinforced with the flexible honeycomb structure discs 45A and 45B, which may have cells constructed as shown above and may have reinforcing flexible "skin" layer 46. The skin 46 may also contain various fibers, such as described for the outer layer of the tire. However, the tire 44 should be filled with pressurized air, and the honeycomb discs 45A and 45B will support the weight of a vehicle only in case of the air pressure loss, and may serve only as a temporary safe tire. The described honeycomb discs 45A and 45B will always have a lighter structure than solid composite wall reinforcements and may be locked to the rim 47 by similar serrations and or bonding as described above. This tire should also be additionally secured by a rim insert 47A.

Figure 23:
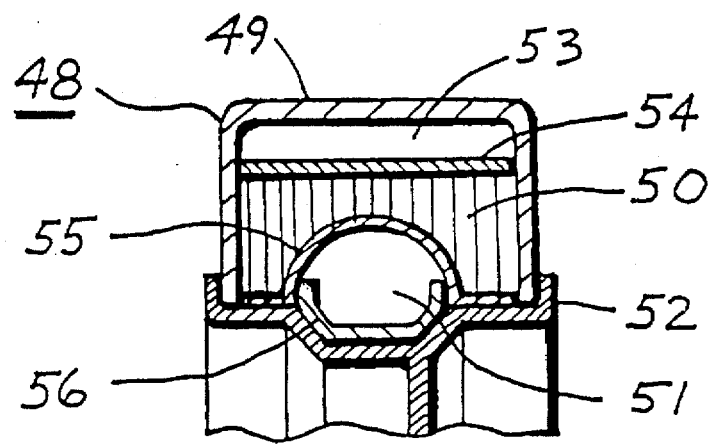
FIG. 23 is a sectional view, similar to FIG. 3, showing additional radial space under the outer circumferential surface layer of the tire, according to the subject invention.

Another embodiment of the invention which is shown in FIG. 23 illustrates a similar sectional view of a tire 48 having a partially filled outer layer 49 with a flexible honeycomb "bridge" 50, which is bonded to outer layer 49. The honeycomb bridge 50 has a radial relief space 51 facing the rim 52 as described above, and an additional radial space 53 provided under the outer circumferential surface of the layer 49 as shown. This tire 48 should also be filled with pressurized air, primarily in the radial relief space 51 and the radial space 53. Both spaces 51 and 53 may be interconnected through the open celled honeycomb bridge 50 or the honeycomb bridge 50 may have a connecting hole or holes there-through (not shown). In case of the air pressure loss, the tire will only go partially flat, because the outer layer 49 will rest on the supporting honeycomb bridge 50. The bridge 50 may have also a top radial skin belt 54 and/or a bottom radial skin 55 optionally added and bonded to the honeycomb bridge 50. Either skin 54 or 55 may contain various fibers as required. The tire 48 also may serve only as a temporary safe tire. This tire 48 may also be secured by an optional radial rim insert 56, and may be locked to the rim 52 by described serrations and/or bonding (not shown).

The tires as described above are also very damage resistant, which make them desirable for military vehicles, and other heavy duty vehicles.

Said tires can be engineered for higher stiffness and hardness by the selection of appropriate harder elastic materials for honeycomb construction, or selection of cell sizes and their wall gages or both, to increase the honeycomb density and stiffness, to achieve lower rolling resistance and thus make them applicable for electric vehicles and high mileage range vehicles.

The tires without pressurized air do not require servicing to maintain air pressure, and have a longer useful life due to the excellent wear resistance of the polyurethane, ultrahigh molecular weight polyethylene fibers, and carbon fillers. The tire safety is enhanced by the absence of high pressure air in the tire and thus no chance of a flat or blow out.

It should of course be understood, that the description and drawings herein are merely illustrative and various modifications, changes and combinations of the embodiments disclosed can be made without departing from the spirit of the invention and the scope of the appended claims.

It will thus be seen that safer, lightweight and damage resistant tire construction has been provided with which the objects of the invention are achieved.

I claim:

1. A tire construction for automotive and other vehicles which is mounted to a wheel and which comprises:

an outer elastic layer structure, an inner elastic filler core material, bonded to said outer elastic layer structure, and which has an elastic honeycomb cells construction, said filler core material has conically shaped honeycomb cells with two parallel sides, which cells are oriented substantially lengthwise in the direction from the center of the tire to the outside circumferential surface of the tire, said honeycomb cells are formed from corrugated washer layers which are bonded together, said inner elastic filler core material has a radial relief at the inner center of the circumferential surface of said tire facing the rim of said wheel, and in which said relief provides for mounting or dismounting said tire by stretching said tire over the wheel rim.

2. A tire construction as described in claim 1, in which said wheel has a one piece rim for mounting or dismounting said tire.

3. A tire construction as described in claim 1, in which an additional elastic layer is provided to which said elastic core radial relief is bonded.

4. A tire construction as described in claim 3, in which said additional elastic layer also contains axial leaf springs.

5. A tire construction as described in claim 1, in which said elastic filler core material is reinforced by two elastic radial discs which are bonded to said core.

6. A tire construction as described in claim 1, in which said central radial relief extends to the outer layer at the outside circumference of said tire.

7. A tire construction as described in claim 6, in which an additional elastic layer is provided to which said radial relief surface is bonded.

8. A tire construction as described in claim 1, in which a radial wheel rim insert is provided to secure said radial relief in position.

9. A tire construction described in claim 8, in which said rim insert is an axially split assembly and is removable.

10. A tire construction as described in claim 1, in which said elastic filler core has an additional radial relief space under said outer elastic layer structure at the outer circumferential surface of said tire.

11. A tire construction as described in claim 1, which is filled by pressurized air.

12. A tire construction as described in claim 1, in which said honeycomb material has curved shape cells substantially lengthwise oriented in direction from the center of the wheel to the outside circumferential surface of said tire.

13. A tire construction as described in claim 1, in which said honeycomb material has curved shape cells substantially lengthwise oriented in a tangential relationship to the wheel rim.

14. A tire construction as described in claim 1, in which said cells have flanges at, at least one end and said cells and said flanges are bonded to said outer layer structure.

15. A tire construction as described in claim 1, in which said outer elastic layer structure is made from a composite of polyurethane polymer and fibers.

16. A tire construction as described in claim 15, in which said fibers are ultrahigh molecular weight polyethylene fibers.

17. A tire construction as described in claim 1, in which said honeycomb core is made of a polyurethane polymer.

18. A tire construction as described in claim 1, in which said honeycomb core is made of a composite of polyurethane polymer and fibers.

19. A tire construction as described in claim 18, in which said fibers are ultrahigh molecular weight polyethylene fibers.

20. A tire construction as described in claim 1, in which said outer elastic layer structure is made from a composite of rubber and fibers.

21. A tire construction as described in claim 20, in which said fibers are ultrahigh molecular weight polyethylene fibers.

22. A tire construction as described in claim 15, in which said fibers are steel fibers.

23. A tire construction as described in claim 20, in which said fibers are steel fibers.

24. A tire construction as described in claim 1, in which said honeycomb core is made of rubber.

25. A tire construction as described in claim 1, in which said honeycomb core is made from a composite of rubber and fibers.

26. A tire construction as described in claim 25, in which said fibers are ultrahigh molecular weight polyethylene fibers.

27. A tire construction as described in claim 1, in which said honeycomb core is made from an elastic material reinforced with fibers.

28. A tire construction as described in claim 1, in which said elastic outer layer structure contains a filler material.

29. A tire construction as described in claim 1, in which said honeycomb core material contains a filler material.

30. A tire construction as described in claim 28, in which said filler material is carbon.

31. A tire construction as described in claim 29, in which said filler material is carbon.

32. A tire construction as described in claim 1, in which at least one of said bondings is by welding.

33. A tire construction as described in claim 1, in which at least one of said bondings is by an adhesive.

34. A tire construction as described in claim 1, in which said honeycomb core has cells of a hexagonal cone shape.

35. A tire construction as described in claim 1, in which said honeycomb core has cells of a square cone shape.

36. A tire construction as described in claim 1, in which said honeycomb core has cells of a rectangular cone shape.

37. A tire construction as described in claim 1, in which said honeycomb core has cells of a rounded cone shape.

38. A tire construction as described in claim 1, in which said honeycomb core has various shapes of cells combined.

39. A tire construction as described in claim 1, in which said outer elastic layer has a tread on the largest circumferential surface of said tire.

40. A tire construction as described in claim 1, in which said outer elastic layer structure has a radial reinforcing belt embedded in the outer circumferential layer of said tire.

41. A tire construction as described in claim 1, in which said outer elastic layer structure has a plurality of substantially axial grooves on the inner circumferential surface of the tire, facing the wheel rim.

42. A tire construction as described in claim 32, in which said welding is ultrasound welding.

43. A tire construction as described in claim 1, in which said honeycomb core consists of a plurality of annular layers of cells.

44. A tire construction as described in claim 1, in which said outer elastic layer structure is bonded to a wheel rim.

45. A tire construction as described in claim 1, in which at least one of said bondings is fusion bonding.

46. A tire construction as described in claim 1, in which said vehicles are utility vehicles, military vehicles, electric vehicles, and high mileage range vehicles.

47. A tire construction as described in claim 6, which is filled by pressurized air.

48. A tire construction as described in claim 10, which is filled by pressurized air.

* * * * *